United States Patent
Garg et al.

(10) Patent No.: US 7,872,994 B2
(45) Date of Patent: Jan. 18, 2011

(54) SIP OUT-OF-DIALOG REFER MECHANISM FOR HANDOFF BETWEEN FRONT-END AND BACK-END SERVICES

(75) Inventors: Juhee Garg, San Jose, CA (US);
Randall B. Baird, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 582 days.

(21) Appl. No.: 11/502,980

(22) Filed: Aug. 11, 2006

(65) Prior Publication Data

US 2008/0037447 A1  Feb. 14, 2008

(51) Int. Cl.
*H04L 12/16* (2006.01)
(52) U.S. Cl. ...................................................... 370/260
(58) Field of Classification Search ............... 379/88.02; 709/238, 227, 228; 370/260
See application file for complete search history.

(56) References Cited

U.S. PATENT DOCUMENTS

| | | | |
|---|---|---|---|
| 7,480,723 B2 * | 1/2009 | Grabelsky et al. | ........... 709/228 |
| 2003/0088421 A1 | 5/2003 | Maes et al. | |
| 2003/0123619 A1 * | 7/2003 | McKinnon et al. | ........ 379/88.02 |
| 2004/0103282 A1 | 5/2004 | Meier et al. | |
| 2004/0205209 A1 | 10/2004 | Wengrovitz et al. | |
| 2004/0255302 A1 | 12/2004 | Trossen | |
| 2006/0026288 A1 * | 2/2006 | Acharya et al. | ............. 709/227 |
| 2006/0288120 A1 * | 12/2006 | Hoshino et al. | ............. 709/238 |

FOREIGN PATENT DOCUMENTS

WO    WO 94/09598    4/1998

* cited by examiner

*Primary Examiner*—Derrick W Ferris
*Assistant Examiner*—Gbemileke Onamuti
(74) *Attorney, Agent, or Firm*—The Law Office of Bradley J. Bereznak

(57) ABSTRACT

In one embodiment, a method includes steps of verifying, by a first server, that a user associated with an endpoint is authorized to access a service provided by a second server. The first server then sends a Session Initiation Protocol (SIP) out-of-dialog REFER with a Replaces header to the second server. A dialog identification ID of a session between the endpoint and the first server is embedded within the Replaces header. The SIP out-of-dialog REFER causes the second server to send a SIP INVITE with the Replaces header to the endpoint to establish a new session between the endpoint and the second server. It is emphasized that this abstract is provided to comply with the rules requiring an abstract that will allow a searcher or other reader to quickly ascertain the subject matter of the technical disclosure.

15 Claims, 3 Drawing Sheets

SIP OUT-OF-DIALOG REFER MECHANISM FOR HANDOFF BETWEEN FRONT-END AND BACK-END SERVICES

FIELD OF THE INVENTION

The present invention relates generally to the fields of telephony networks and telecommunications; more specifically, to methods and apparatus for handling conference sessions involving a group of individuals communicating over an Internet protocol (IP) network.

BACKGROUND OF THE INVENTION

Many conferencing systems implement a "front-end" ingress service with a voice user interface (VUI) that users dial into. The VUI typically implements an interactive voice response (IVR) system that is used to identify the meeting (e.g., meeting ID), the user (i.e., conference participant), solicit authentication and/or credential information from the user, and then handoff (i.e., transfer) the user to a specific instance "back-end" conference service. The specific conference service is responsible for allocating necessary resources and establishing the connections/media paths required to actually conduct and manage the conference session. When the conference service is co-located with the VUI, the handoff from the front-end service to the back-end service is a relatively simple internal operation, requiring little or no protocol interaction with the user's endpoint device. Often times, however, the front-end and one or more back-end services are split due to reasons that include the need for the scheduling system to distribute the load on various network resources. When the conference or meeting is handled by a different service on a separate network server from the VUI, a need arises for a protocol that causes the endpoint dialog with the front-end VUI service to re-target to the back-end conference service without a new call being placed.

One prior art method for implementing the handoff from the VUI to the conference service utilizes a basic Session Initiation Protocol (SIP) REFER message that is sent from the VUI server to the user endpoint device. SIP is a well known protocol used for setting up and tearing down voice, video, or other multimedia calls. The actual multimedia communications in SIP is done, for example, using the Real-Time Transport Protocol (RTP). SIP is one of the leading signaling protocols for voice over IP (VoIP) communications. The SIP REFER method is documented in Request for Comments (RFC) 3515. The SIP REFER sent from the VUI causes the endpoint to send a new INVITE message to the proper conference server. One problem with this approach, however, is that it typically lacks a security mechanism for properly authenticating the endpoint device with the conference service. For example, if the VUI server is responsible for collecting and verifying authentication and authorization information from the user endpoint device, a secure method for conveying information that the authorization was successful must be included in the REFER to the endpoint, and the endpoint must be able to further convey that information in the INVITE to the conference server in a secure fashion. Some endpoints may be unable to provide such a secure conveyance.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION OF EXAMPLE EMBODIMENTS

In the following description specific details are set forth, such as device types, system configurations, authentication methods, etc., in order to provide a thorough understanding of the present invention. However, persons having ordinary skill in the arts will appreciate that these specific details may not be needed to practice the present invention.

In the context of the present application, a computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

Figure 1:
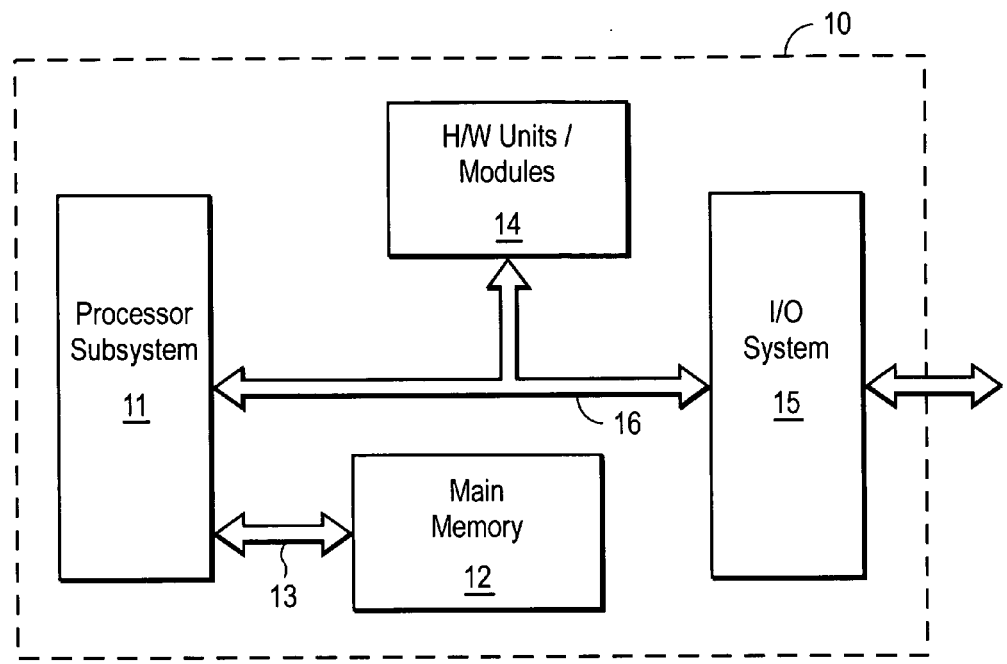
FIG. 1 is a generalized circuit schematic block diagram of a network node.

As shown in FIG. 1, each node 10 typically comprises a number of basic subsystems including a processor subsystem 11, a main memory 12 and an input/output (I/O) subsystem 15. Data is transferred between main memory ("system memory") 12 and processor subsystem 11 over a memory bus 13, and between the processor and I/O subsystems over a system bus 16. Examples of the system bus may include the conventional lightning data transport (or hyper transport) bus and the conventional peripheral component [computer] interconnect (PCI) bus. Node 10 may also comprise other hardware units/modules 14 coupled to system bus 16 for performing additional functions. Processor subsystem 11 may comprise one or more processors and a controller device that incorporates a set of functions including a system memory controller, support for one or more system buses and direct memory access (DMA) engines. In general, the single-chip device is designed for general-purpose use and is not heavily optimized for networking applications According to one embodiment of the present invention, a mechanism is provided by which a first "receptionist" VUI service solicits information from callers/users who wish to participate in a scheduled conference session. The information typically includes the meeting ID, the user's name, and authentication information (e.g., a password or other authentication code) required to access/join the conference session. Once it has gathered the necessary information and has verified that the user is entitled to participate in the conference session, the VUI service then dispatches (i.e., transfers or hands off) the user to the conference service. The transfer is accomplished utilizing an out-of-dialog SIP REFER with embedded Replaces header sent from the VUI service to the conference service. In response, the conference service sends a SIP INVITE to the user endpoint device, using the Replaces information sent in the REFER. This results in a dialog being established between the endpoint device and the conference service, thereby allowing the user to participate in the conference session. At the same time, the INVITE with replaces header method results in the previous session between the endpoint device and the VUI service being disconnected.

Although aspects of the present invention are described in conjunction with a conferencing application, practitioners in the art will appreciate that the present invention is broadly applicable to applications and systems that rely upon a first service to screen/authenticate users who wish to access a second service. In addition to authenticating users, the first service also functions to dispatch or handoff the user to the second service without the need for a new call to be placed.

Figure 2:
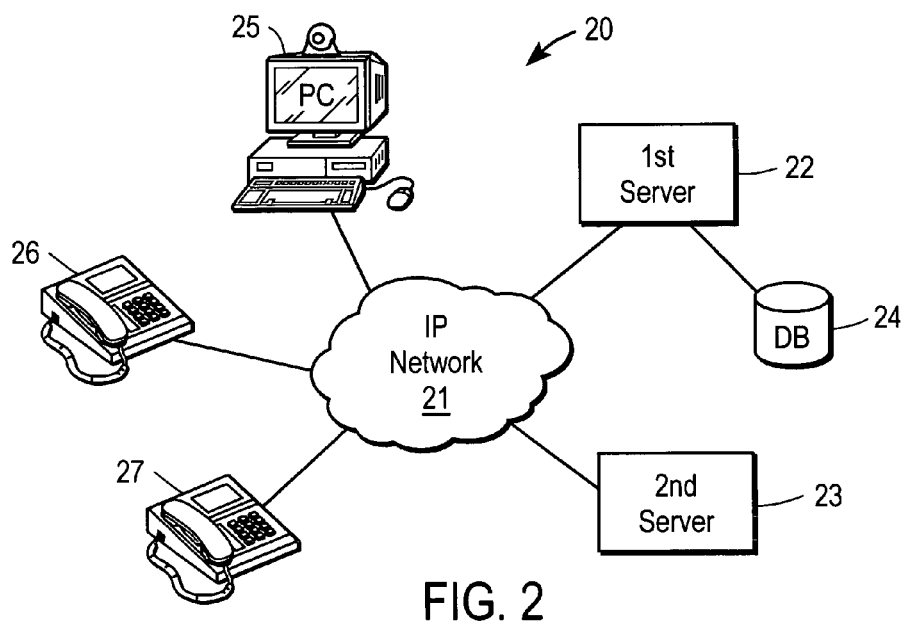
FIG. 2 is a conceptual diagram of a communications network.

Referring to FIG. 2, there is shown an example communications network 20 with endpoint devices 25-27 connected with an internet protocol (IP) network 21. In this example, each of the endpoint devices is SIP compatible. The endpoint devices are shown comprising a personal computer (PC) 25 with software components for placing/receiving calls that include audio and video sessions through SIP, and SIP-compatible IP phones 26 & 27. Each of endpoint devices 25-27 includes a processor and executable code that supports the protocol enhancements and functionality described below. Other endpoint devices not specifically shown in FIG. 1 that may also be used to initiate or participate in a call or receive SIP messages from a network node include a personal digital assistant (PDA), a laptop or notebook computer, or any other device, component, element, or object capable of initiating or participating in voice, video, or packet-data exchanges with communications system 20 in accordance with the protocols described herein. In addition, non-SIP devices may be able to access the services described by connecting through a network-to-network protocol converter. For example, IP stations running SCCP or H.323 may connect to a Cisco Call Manager™, which may access the services over a SIP trunk.

Communications network 20 is also shown including a first server 22 coupled with a database 24, and a second server 23. In the example of FIG. 2 server 22 implements a VUI service for authenticating users who wish to attend a conference session conducted by second server 23. In one embodiment, server 22 may comprise a processing component such as such as Cisco's CallManager™ system, or Cisco's MeetingPlace™ conferencing application with appropriate software/firmware modules, plug-ins, or enhancements for implementing the functions described herein. By way of example, Cisco's MeetingPlace™ conferencing application allows users to schedule meeting conferences in advance or, alternatively, to set up ad-hoc or reservationless conferences through the VUI once they have dialed in. Cisco MeetingPlace™ is typically deployed on a corporate network and facilitates scheduling of business conferences from a touch-tone or voice over IP (VoIP) telephone, or a computer, using various software clients, such as Microsoft® Outlook, or a web browser.

The VUI service associated with server 22 functions as a screener of callers or users of the conferencing service. In operation, the VUI may solicit meeting ID, username, password, and other authentication information or credentials from the user to verify that the user is entitled to use the secondary service (e.g., conferencing) provided by server 23. Accordingly, server 22 may access database 24 to retrieve the necessary information stored therein to verify the authenticity of the user and to verify that the user is authorized to attend the meeting. The secondary service provided by server 23 is the main service that the user is attempting to access or invoke. The VUI implemented on first server 22 performs the upfront authentication/information gathering tasks, as well as the dispatch or distributing functions for transparently handing off the caller/user to one or more secondary services. In this regard, although FIG. 2 illustrates a single server 23 providing the secondary service in the present example, it is appreciated that in certain applications front-end server 22 can handoff the caller/user to any of a plurality of back-end servers, e.g., 23a, 23b, 23c, etc.

Practitioners will appreciate that the VUI associated with server 22, as well as database 24, can reside anywhere on the communications network (e.g., IP network 21). In certain embodiments, server 22 and database 24 may be incorporated into a single physical box or logical entity. Likewise, in an alternative embodiment, servers 22 & 23 may be implemented in a single physical box that provides logically distinct functional services. In other words, the first and second services referred to in the present application in most cases denote different nodes devices in network 20, although the different services could reside or be housed in a single node/device unit.

Figure 3:
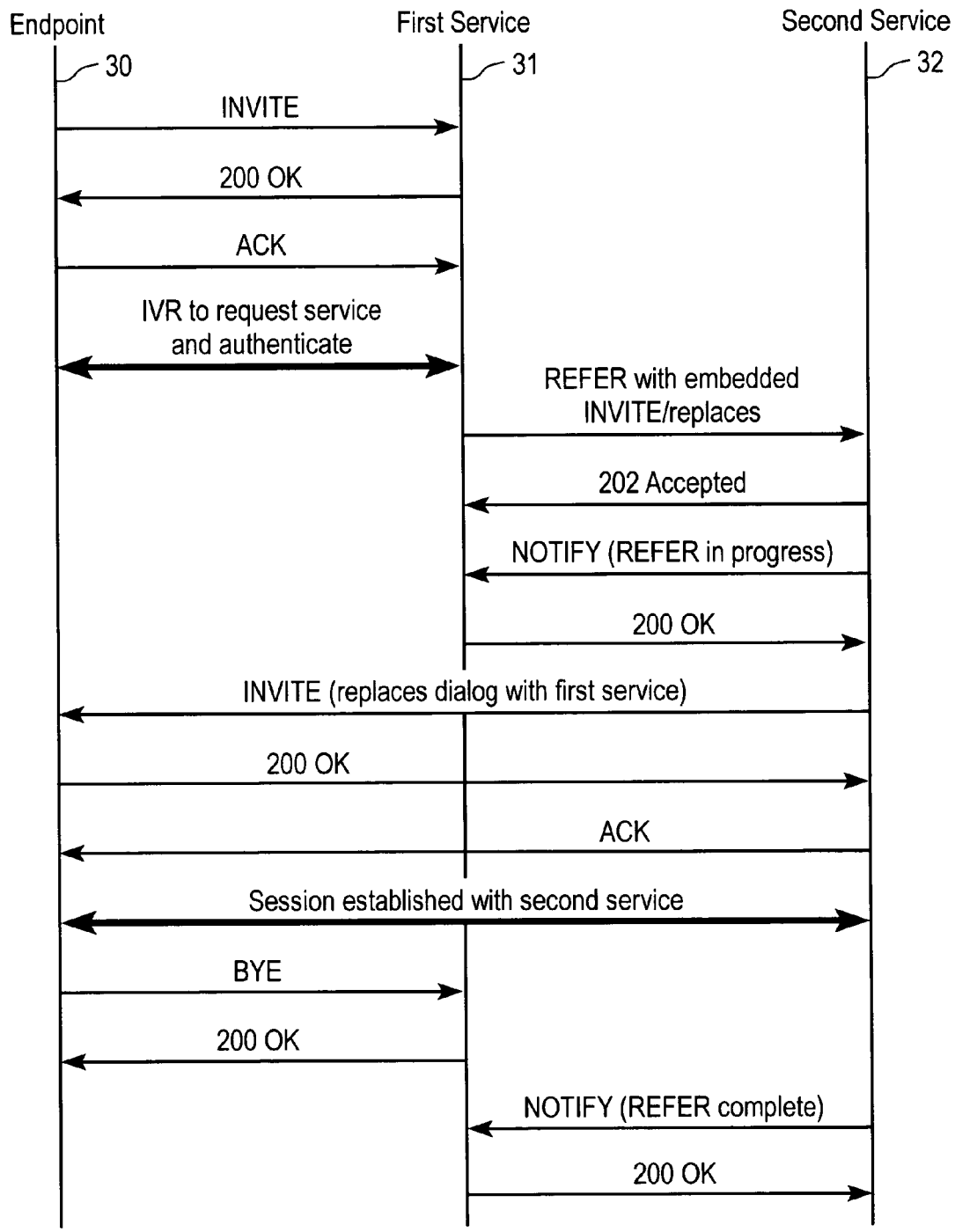
FIG. 3 is a call flow diagram that illustrates a procedure for distributing a call to a conference service.
Figure 4:
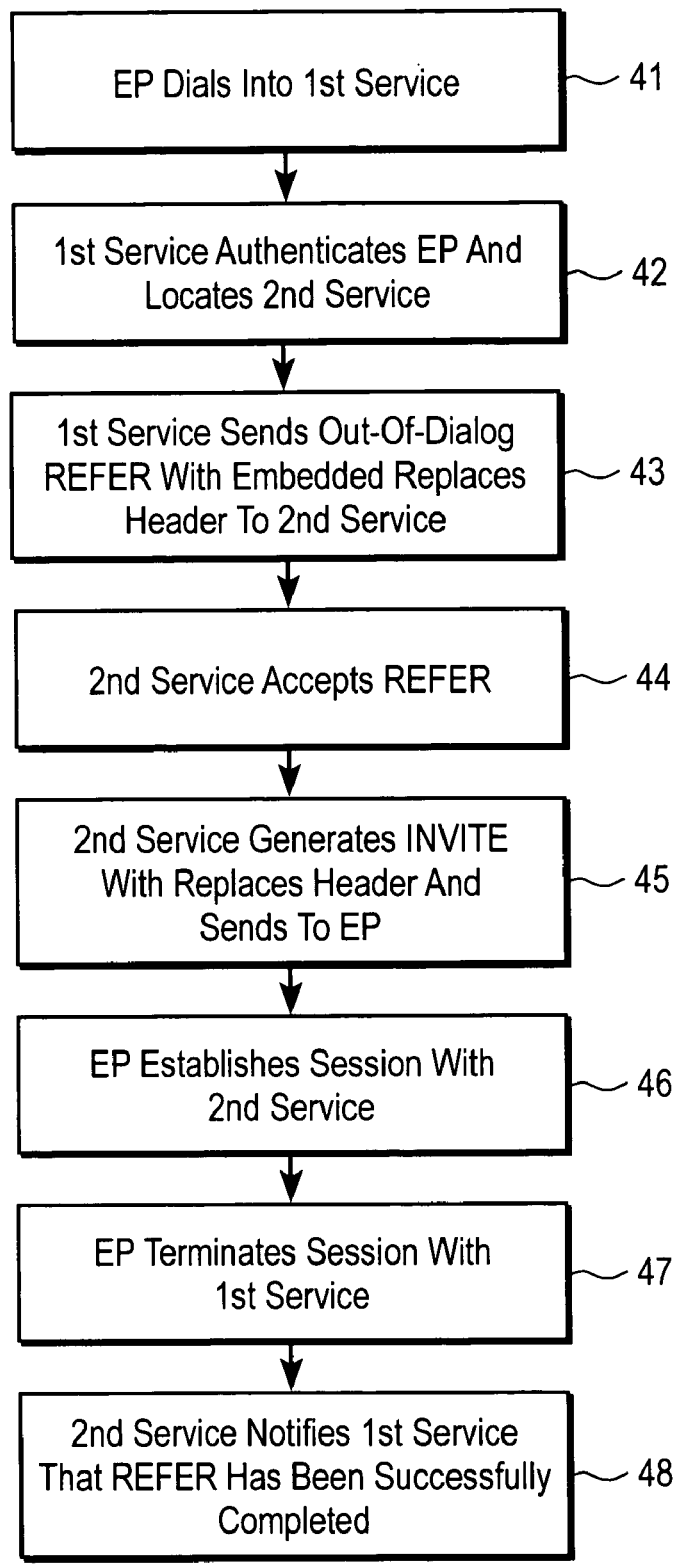
FIG. 4 illustrates a method of operation corresponding to the call flow diagram of FIG. 3.

FIG. 3 is a call flow diagram that illustrates a procedure for distributing a call to a conference service. FIG. 4 is a flowchart diagram showing a method of operation corresponding to the call flow diagram of FIG. 3. As such, the example method of FIG. 4 will be described in conjunction with the call flow diagram of FIG. 3. Note that in FIG. 3, the user endpoint device is represented by line 30, the first service is represented by line 31, and the second service is represented by line 32. (Practitioners in the art will understand that the SIP protocol described in FIG. 3 describes an example usage, and that it is abbreviated for the purposes of clarity.)

The method of FIG. 4 begins with a user dialing in from his endpoint device into the first service (block 41). This assumes that a conference session has already been scheduled as a specific conference instance (e.g., meeting ID) and that the conference instance has been assigned to one or more specific second servers. This step is shown in the call flow diagram of FIG. 3 by the SIP INVITE sent from endpoint 30 to first service 31, inviting the first service to participate in a call session with endpoint 30. This is followed by a 200 OK back from first service 31 to endpoint 30 indicating a successful receipt of the INVITE. Endpoint 30 then confirms that it has received a final response to an INVITE request by sending an acknowledgement (i.e., ACK). Following this message exchange a dialog exists between endpoint 30 and the first service 31. This dialog controls a voice or multimedia session between endpoint 30 and first service 31. At this point, the VUI of first service 31 may use voice and DTMF media to interact with the user via an IVR to acquire the necessary meeting ID, authentication information, etc.

It should be understood that the endpoint may dial into any one of a set of VUIs using an access Uniform Resource Identifier (URI). Note that a proxy system can arbitrarily distribute the endpoint's INVITE to any VUI, using any method to achieve the distribution. Distribution may be based on currently perceived load on the various VUIs, topological proximity between the endpoint and VUI, or just random assignment. All instances of the VUI may be accessed through a single, common URI, representing, for example, a single telephone directory number (DN). This allows all endpoints to access any meeting through a single number dial-in system.

Once first service 31 has obtained the necessary information from endpoint 30, first service 31 may access a database to locate the meeting, authenticate the user's identity, verify that the user is authorized to participate in the meeting, and determine the conference server on which the conference session will be hosted (block 42 in FIG. 4). After completing these tasks, first service 31 sends an out-of-dialog REFER to second service 32, i.e., the conference service. This step is shown in FIG. 4 by block 43.

Two message header lines are utilized in the REFER to ensure that the endpoint device ultimately ends up being connected to the proper conference instance. The first header is the REFER's "To" message header line, which contains a URI identifying the proper instance and server of the second service. For example, if the conference service is hosted on a conference server whose domain name system (DNS) name is "confserver42.belchfire.com", and the conference ID for this meeting is "1234", an example To message header line may be "To: sip:1231@confserver42.belchfire.com".

The second header line is the REFER's "Refer-to" message header line, which tells the conference service to connect to the endpoint device. The Refer-to message header line contains a URI representing the endpoint device. Embedded within the URI is a parameter representing a "Replaces" message header, which, when processed and copied into a subsequent INVITE message, causes a new dialog and session between the conference service 32 and the endpoint device 30 to replace the existing dialog and session between the first service 31 and the endpoint 30. This dialog is represented by a dialog ID. For example, if the endpoint's URI is "sip:12345@endpoint57.belchfire.com" and the dialog ID of the dialog between the endpoint 30 and the first service 31 is "1a43bc7Jm@endpoint57.belchfire.com; To-tag=3141; From-tag=1414", then the complete Refer-to message header line may be "Refer-to: <sip:12345@endpoint57.belchfire.com?Replaces=1a43bc7Jm%40endpoint57.belchfire.com%3BTo-tag %3D3141%3BFrom-tag %3D1418>".

If, for example, the first and second services are deployed by a common service provider, each service can be configured to have a trusted relationship with the other. When such a trust relationship is established, the credentials of the participant attempting entry into the conference service need not be conveyed to the conference service, since the second service implicitly trusts that the first service has used its VUI to authenticate and authorize the participant. This simplifies the admission procedures required by the conference service, since it does not need to interact with the endpoint 30 to re-authenticate and reauthorize.

A variety of methods may be used by second service 32 to insure that first service 31 is authentic. One method is for the second service to only accept SIP messages and information that are transmitted over a Transport Layer Security (TLS) or Secure Socket Layer (SSL) connection between the two services. Alternatively, security may be provided by a secure Multipurpose Internet Mail Extension (S/MIME) body part that contains authentication information embedded within the REFER header sent from the first service to the second service.

Once the REFER has been determined to be legitimate, second service 32 receives and accepts the REFER. This results in the second service 32 responding by sending a response (202 Accepted) to first service 31, followed by second service 32 also sending a NOTIFY back to first service 31 to indicate that it is working on the REFER, receipt of which is then acknowledged (200 ACK) by the first service.

Once accepted, second service 32 processes the REFER, which results in the second service sending an INVITE to endpoint 30. The INVITE contains a "Replaces" message header line that contains a dialog ID constructed from the dialog ID contained in the embedded Replaces parameter in the REFER's "Refer-to" URI. This is shown occurring at block 45.

Finally, once the new session is established, endpoint 30 immediately disconnects the dialog and session described by the dialog ID, i.e., the session between endpoint 30 and first service 31 (block 47). It does this by sending a BYE message to first service 31, which responds with a 200 (OK) message, thereby ending the session. In this manner, endpoint 30 has been instructed to transfer its session from first service 31 to second service 32

Endpoint 30 receives the INVITE with "Replaces" message header line and processes it, for example, according to standard protocol procedures. Endpoint 30 interprets the Replaces message header line as indicating, first, that the INVITE requests that the dialog and session to be established replaces the dialog and session whose dialog ID is in the Replaces message header line, i.e., the dialog controlling the session between endpoint 30 and first service 31. Second, because the INVITE contains a Replaces message header line, endpoint 30 does not alert its user of a new incoming call, as it would do upon receipt of an INVITE without a Replaces message header line. Instead, endpoint 30 immediately continues with establishment of the new dialog and session by sending a message (200 OK) back to second service 32, which in turn responds with an ACK message, completing the session establishment (block 46).

Finally, once the new session is established, endpoint 30 immediately disconnects the dialog and session described by the dialog ID, i.e., the session between endpoint 30 and first service 31 (block 47). Endpoint 30 does this by sending a BYE message to first service 31, which responds with a 200 OK message, thereby ending the session. In this manner, endpoint 30 transfers its session from first service 31 to second service 32.

Note that at no time does endpoint 30 initiate a communication with second service 32; rather, communications are initiated by second service 32. As a result, second service 32 does not have to re-verify that an inbound communication attempt from the endpoint is authentic or authorized. Instead, second service 32 trusts that authentication and authorization has been handled by first service 31 prior to initiation of the REFER.

When second service 32 completes the session establishment with endpoint 30, it notifies first service 31 that the REFER has been successfully completed by sending a NOTIFY with a successful completion indication back to first service 31 (block 48). First service 31 acknowledges receipt of the NOTIFY by sending a 200 OK response; at that point first service 31 considers the REFER request to be complete.

Practitioners in the networking and communications arts will appreciate that the embodiments described above are transparent to the client endpoint devices. That is, no changes are required to existing client endpoint so long as they can implement SIP INVITE with Replaces. Also, alternative embodiments may include additional message headers embedded in the Refer-to URI. For example, the first service 31 may also embed a "Referred-by" message header in the Refer-to URI, facilitating security procedures that the endpoint 30 may wish to implement.

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For example, the present invention is not limited to audio/video applications and may also be useful to other communication technologies involving a front-end service that distributes communication calls to one or more back-end services. Accordingly, the specification and drawings are to be regarded in an illustrative rather than a restrictive sense.

We claim:

1. A method for implementing a conference session among a plurality of users connected over an Internet Protocol (IP) network, comprising:
   receiving, by a front-end ingress service having a voice user interface (VUI), a request from an endpoint to access a back-end conference service, the request being transmitted over the IP network, a first dialog being established between the endpoint and the front-end ingress service after receipt of the request;
   obtaining information over the IP network from the endpoint that entitles a user of the endpoint to access the back-end conference service;
   sending, by the front-end ingress service, a Session Initiation Protocol (SIP) out-of-dialog REFER message over the IP network to the back-end conference service that instructs the back-end conference service to send an INVITE message over the IP network directly to the endpoint, the INVITE message causing a second dialog to be established between the endpoint and the back-end conference service, the second dialog replacing the first dialog, the SIP out-of-dialog REFER message including a first message header line containing a first identifier of the back-end conference service, and a second message header line containing a second identifier specifying the endpoint and an embedded SIP Replaces message header specifying an identifier of the first session; and
   receiving a SIP BYE message sent by the endpoint over the IP network that ends the first session after the second session between the back-end conference service and the endpoint has been established.

2. The method of claim 1 further comprising:
   receiving, by the front-end service, a SIP NOTIFY sent from the back-end service indicating that the second session has been established.

3. The method of claim 1 further comprising:
   accessing a database, by the front-end service, to locate the second service in response to the request.

4. A method for implementing a conference session among a plurality of users connected over an Internet Protocol (IP) network comprising:
   verifying, by a first server, that a user associated with an endpoint is authorized to access a service provided by a second server; and
   sending, by the first server to the second server over the IP network, a Session Initiation Protocol (SIP) out-of-dialog REFER message with a To message header line identifying the second server, and a Refer-to header containing a Uniform Resource Identifier (URI) identifying an endpoint to which to send an INVITE and a Replaces header with a dialog ID identifying a session between the endpoint and the first server to replace, the SIP out-of-dialog REFER message causing the second server to send a SIP INVITE with the Replaces header over the IP network directly to the endpoint to establish a new session between the endpoint and the second server, the SIP INVITE with the Replaces header also causing the endpoint to disconnect the session with the first server.

5. The method of claim 4 further comprising:
   receiving, by the first server, a SIP NOTIFY sent from the second server indicating that the new session has been established.

6. The method of claim 4 wherein the Replaces header further comprises information authorizing the endpoint to access a conferencing service.

7. The method of claim 4 further comprising:
   accessing a database, by the first server, to locate the second server.

8. A non-transitory computer-readable memory encoded with a computer program, executable by the processor, operable to:
   receive a request from an endpoint sent over an internet Protocol (IP) network to participate in a meeting hosted over the IP network by a conference server;
   obtain information that includes authorization information entitling a user of the endpoint to participate in the meeting; and
   send a Session Initiation Protocol (SIP) out-of-dialog REFER with a Replaces header over the IP network to the conference server, the information being embedded within the Replaces header, responsive to the SIP out-of-dialog REFER the conference server sending a SIP INVITE with the Replaces header over the IP network directly to the endpoint to establish a session directly between the endpoint and the conference server.

9. The non-transitory computer-readable memory of claim 8, executable by the processor, further operable to receive a SIP NOTIFY sent from the conference server following establishment of the session.

10. The non-transitory computer-readable memory of claim 8, executable by the processor, wherein the information includes a meeting identification (ID) and a name of the user.

11. The non-transitory computer-readable memory of claim 8, executable by the processor, wherein execution of the one or more media is further operable to access a database to locate the conference server hosting the meeting.

12. A non-transitory computer-readable memory encoded with a computer program, executable by the processor, operable to:
   invoke a voice user interface (VUI) that interacts over an Internet Protocol (IP) network with a caller using an endpoint during a dialog session to acquire information that includes an identification (ID) of a meeting hosted over the IP network;

access a database to locate a conference server hosting the meeting; and send a Session Initiation Protocol (SIP) out-of-dialog REFER with an embedded Replaces header over the IP network to the conference server, the Replaces header including a dialog ID of the dialog session, in response to the SIP out-of-dialog REFER the conference server sending a SIP INVITE with the Replaces header over the IP network directly to the endpoint to establish a new dialog session directly between the endpoint and the conference server without any transfers or forwarding of SIP messages between the endpoint and the conference server by any intermediary server.

13. The non-transitory computer-readable memory of claim 12, executable by the processor, further operable to receive a SIP NOTIFY sent from the conference server following establishment of the new dialog session.

14. A node for allowing a plurality of users to participate in a meeting comprising:

an interface for connection with a network;

a computer-readable memory encoded with a computer program that runs on the node, when executed, is operable to produce a voice user interface (VUI), the VUI interacting with a user of an endpoint device who wants to access a conference server hosting the meeting over the network, during a dialog session with the endpoint over the network the VUI operating to acquire information that includes authentication information of the user, the program verifying the authentication information and then sending a Session Initiation Protocol (SIP) out-of-dialog REFER with an embedded Replaces header via the interface to the conference server over the network, the Replaces header including a dialog ID of the dialog session, in response to the SIP out-of-dialog REFER the conference server sending a SIP INVITE with the Replaces header directly to the endpoint to establish a new dialog session directly between the endpoint and the conference server without any transfers or forwarding of SIP messages between the endpoint and the conference server by the node or any other intermediary server.

15. The node of claim 14 wherein the program is further operable to terminate the dialog session between the VUI and the endpoint after a SIP NOTIFY sent from the conference server is received at the interface.

* * * * *